Oct. 10, 1950     E. P. DOBRIN     2,524,894
ADJUSTABLE-ANGLE THERMOMETER
Filed Sept. 23, 1947
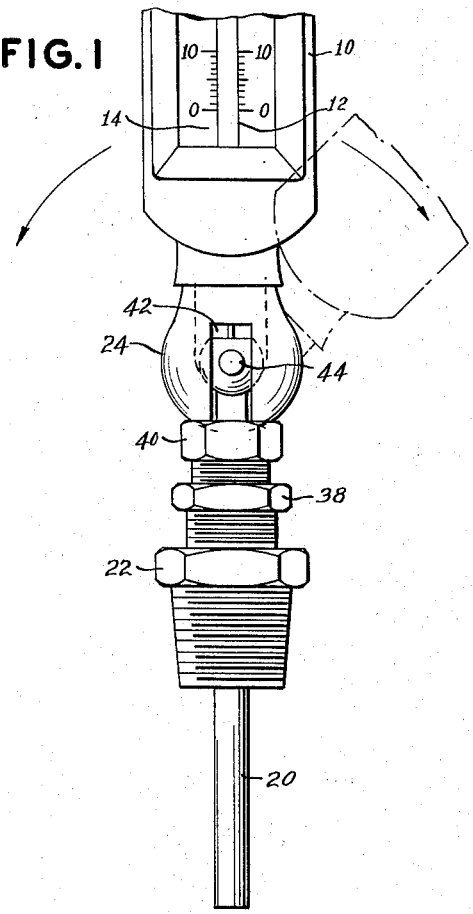
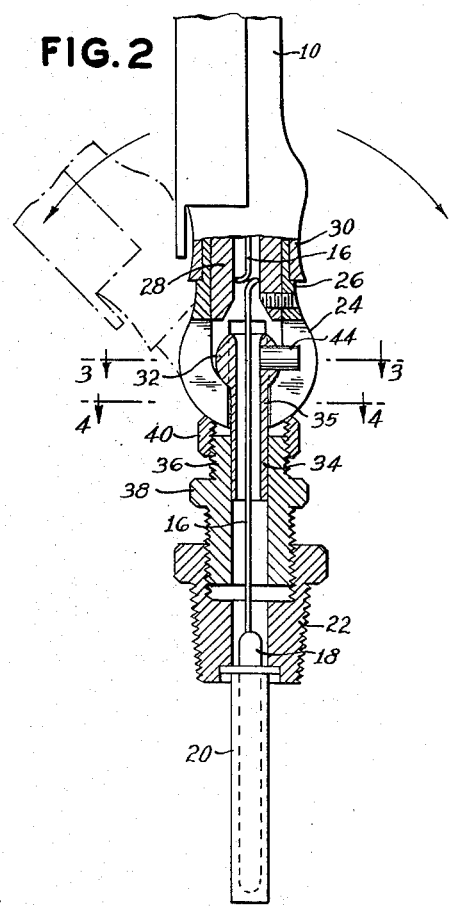
INVENTOR
EDWARD P. DOBRIN
BY
ATTORNEYS Patented Oct. 10, 1950

2,524,894

UNITED STATES PATENT OFFICE 2,524,894

ADJUSTABLE-ANGLE THERMOMETER

Edward P. Dobrin, New York, N. Y., assignor to Weksler Thermometer Corporation, New York, N. Y., a corporation of New York Application September 23, 1947, Serial No. 775,691

10 Claims. (Cl. 73—368)

My invention relates to improvements in industrial thermometers and more particularly to an improved adjustable-angle thermometer.

Industrial thermometers conventionally include a stem and bulb with the stem mounted in a casing and the bulb extending into a well which is positioned in an apparatus for which the temperature is desired. Industrial thermometers have been made so that when they are mounted on a piece of equipment the casing will present the scale at some particular fixed angle. For example, side angles and reclining and inclining thermometers are made having fixed angles to present the thermometer case and scale in the required position, even though the well and its mounting are such that the scale of a straight thermometer would not be conveniently visible.

The primary object of the present invention is to provide an adjustable-angle thermometer for industrial apparatus so that it may be used interchangeably in any position at any desired angle.

Accordingly, my invention comprises an adjustable-angle thermometer including a bulb and stem connected by a substantial length of capillary tubing, a mounting means such as a well, an associated mounting member or case for supporting the thermometer stem in relation to a thermometer scale, and an adjustable ball connection between the bulb mounting means and the case through which the capillary tube extends, the adjustable bulb connection being adapted to permit the pivoting of the case to the desired angle with respect to the position of the bulb.

An industrial thermometer constructed according to the features of my invention has a number of advantages over conventional type rigid angle thermometers because it affords greater visibility at odd angles; simplifies installation; minimizes breakage in transit, installation and operation; eliminates breakage of thermometer tubes due to vibration, shock or strain; reduces the number of instruments required to be kept in stock for plant maintenance; and provides for easy interchangeability from one angle to another.

The improved thermometer of my invention includes other features, objects and advantages which will be described in detail hereinafter in connection with the accompanying drawings forming a part of this application and illustrating one embodiment of my invention. In the drawing:

Fig. 1 is a front elevational view of an adjustable-angle thermometer of the industrial type constructed in accordance with the features of my invention and showing in dotted lines illustrative side angle positions at which the thermometer case may be set.

Fig. 2 is an elevational view partly in section taken at right angles to that of Fig. 1 and showing the details of construction of the adjustable-angle ball connection between the mounting or support and the case. The dotted line positions in this view illustrate reclining and inclining angle positions which the case may take.

Fig. 3 is a horizontal cross-sectional view taken on the line 3—3 of Fig. 2.

Fig. 4 is a horizontal sectional view taken on the line 4—4 of Fig. 2.

Referring to the drawings, the improved thermometer comprises a case 10 of conventional construction including a glass stem 12 mounted over a scale 14. The capillary in the stem 12 is connected by a flexible metal capillary tube 16 with a glass thermometer bulb 18, and the tube 16 is covered with a braided wire mesh for protection. The capillary tube 16 is connected to the stem and bulb by special fused glass-to-metal joints. It is coiled as shown so that it will be of sufficient length to accommodate the various angle positions of the case 10 with respect to the bulb position. The bulb 18 is set in a metal thermometer well 20 which in turn is mounted in a connector unit including a threaded union connection 22 adapted to be screwed into a threaded socket of a tank, still or other equipment. Instead of using the connector unit as shown in the drawings, other conventional connections may be provided so that the thermometer well is inserted into a tank, still or any other piece of equipment.

The structure connecting the thermometer well or bulb mounting means with the thermometer case in the form of the invention illustrated in the drawings, comprises a combination ball and socket unit of special construction. The members attached to the case comprise a general spherical-shaped metal ball 24 having an upwardly-extending sleeve portion 26 which is fitted over and secured to a tubular sleeve 28 of the case 10 by a set screw or other means. The sleeve 26 extends between the tubular extension 28 and an outer sleeve portion 30 comprising a part of the case. It will be noted that the sleeve 28 extends only slightly into the ball member 24.

The bore in the sleeve 26 extends through the upper portion of the ball 24 and into the lower portion, and terminates in a semi-cylindrical socket approximately parallel to the outer circumference of the ball. The ball 24 is also slotted at right angles as shown so that the lower portion is open but to a lesser extent than the bore for the sleeve 28, so as to seat a smaller ball 32 in the semi-cylindrical socket. The ball 32 is integral with a tubular arm or extension 34 having a neck 35 of square cross-section which extends through the lower portion of the ball 24 as shown in Figs. 2 and 4. The bore of the tubular member 34 also extends through the ball 32.

The ball 32 is anchored to the connector unit by the tubular arm 34 which extends into an externally threaded sleeve 36 comprising a part of a swivel connection or nut 38 having a downwardly projecting externally threaded sleeve on which the union 22 is threaded. The arm 34 is secured to the sleeve 36 by a set screw or other means, not shown. The thermometer well 20 may be secured in the connector unit as for example to the downwardly projecting sleeve of the swivel nut 38 in a well-known manner. A lock nut 40 having a cutout upper and inner portion, is threaded on the sleeve 36 so that its inner peripheral rim may be brought into and out of engagement with the outer surface of the ball 24, as shown in Fig. 2. When the ball 24 is set at the desired position, the lock nut 40 is screwed up to engage the ball and lock it in the set position.

The ball 24 in the structure illustrated, is slotted through at right angles from the bottom to a point somewhat above the horizontal diameter of the ball to provide in effect four vertical slots 42, or four rigid fingers 43, the slots being at 90° positions and of a width sufficient to conveniently pass the square-shaped neck 35 of the tubular member 34. The structure of the elements 43 of the ball-shaped member 24 gives the appearance of four converging claw-like fingers which extend partly around the ball 32. As shown in Figs. 3 and 4, these four fingers or quadrants 43 are of generally triangular-shape in cross-section, but of course the external surface is spherical so as to contact with the rim of the lock nut 40. The inner ball 32 is provided with a laterally extending pin 44 which projects into one of the slots 42 as shown in Fig. 3, so as to keep the square neck 35 oriented with respect to the slots 42.

In the operation of the device, the lock nut 40 is normally kept screwed up in close engagement with the outer surface of the ball 24 so that the thermometer case 10 is held in its set position. When the lock nut 40 is screwed up the lower finger sections of the ball 24 are gripped between the nut and the ball 32. The capillary tube 16 extends through the tubular member 28, the tubular ball 32 and integral tube 34 to the bulb 18. The upper portion of the bore in the ball 32 is beveled and the lower portion of the bore in the tubular member 28 is also beveled so that there is no abrupt bending of the capillary tube 16. Furthermore, the upper portion of the ball 32 is somewhat below the lower end of the tubular member 28 so that there is no possibility of pinching the capillary tube when the case is bent to an extreme angle.

When it is desired to set the case at a particular angle with respect to a straight position from the well 20 the lock nut 40 is screwed down slightly and the case pivoted on the ball 32 so that the fingers 43 of a pair of adjacent fingers of the ball 24 pass alongside opposite flat surfaces of the neck 35. As soon as the case is pivoted to the desired position the nut 40 is screwed up against the external surface of the fingers of the ball 24 so that the case will be held in that position.

It will be noted that from a consideration of Figs. 2, 3 and 4, after the thermometer well is set, the case may be pivoted in any of four directions, 90° to each other, and that it may be moved through an arc of at least 90° with respect to its straight position in alignment with the thermometer well. The case may therefore be pivoted through an arc of 180° or more.

In many cases the thermometer can be faced in the correct or desired direction when the union connection 22 is screwed into its socket. When, however, this does not occur, the swivel nut 38 is provided for properly facing the thermometer after the union connection 22 is in place. When this nut is turned the thermometer case and well are rotated simultaneously to the desired facing position.

The adjustable-angle thermometer of the present invention permits the ready observation of temperatures, even though the thermometer may be mounted in a position where it could normally not be read. For example, the thermometer may be located below the observer, and it is made readily visible by simply pivoting the case back so that the observer is looking directly down upon the face of the scale. If the thermometer is located above the observation position, it may be pivoted forward and set there, so that the operator merely looks up squarely at the scale. Where thermometers are set on the side of equipment, the scale may be made vertical by merely pivoting the case to a vertical position and setting the lock nut 40 as before.

While the structure connecting the adjustable ball unit with the case and thermometer well may be made in various ways, the essential features comprise the ball fingers which retain a ball member in such a way that the fingers may be pivoted around the retained ball and set in any position desired. In assembling the apparatus the upper bore in the ball 24 is sufficiently large to accommodate the smaller ball 32, the tubular extension of which is secured in the connector unit of the apparatus. The ball 24 may have one or more slots 42 as desired. Various other changes may be made in the structure and still achieve the results and functions described above. Such changes are contemplated as coming within the spirit and scope of the invention as defined by the appended claims.

I claim:

1. An adjustable-angle thermometer comprising a bulb and stem connected by a flexible capillary tube, a mounting means having a tubular part for supporting the bulb, a case for supporting the stem, and an adjustable ball and socket connection between the bulb mounting means and the case having a passageway through which the capillary tube extends, said ball and socket connection permitting the pivoting of the case to the desired angle with respect to the position of the bulb mounting means.

2. A thermometer as defined by claim 1 in which the adjustable ball and socket connection comprises a ball and socket joint in which the member comprising the socket is slotted through at right angles to permit the pivoting of the case through a large angle, and means for retaining the socket in fixed position with respect to the ball.

3. A thermometer as defined by claim 1 in which the ball and socket connection comprises a socket member having an outer spherical surface, and means for engaging said surface to lock the connection in fixed position.

4. A thermometer as defined by claim 1 in which the ball and socket connection comprises a ball and socket joint in which the socket member has a spherical outer surface and is cut through with slots at right angles to each other, the slots being narrower than the ball of the ball and socket connection.

5. A thermometer as defined by claim 1 in which the ball and socket connection includes a socket structure comprising four finger-like members mounted in a fixed spaced relation to each other around the ball, the free ends of said members converging around the ball sufficiently to form a socket therefor.

6. A thermometer as defined by claim 1 in which said ball and socket connection includes means for preventing appreciable axial rotation of the socket with respect to the ball.

7. A thermometer as defined by claim 10 in which means is provided for engaging the outer portion of the slotted ball member and locking it in fixed position.

8. A thermometer as defined by claim 10 in which the bulb and stem are glass and said tube extends through the ball members.

9. A thermometer as defined by claim 10 in which the slotted ball member has a spherical outer surface, and a locking means threaded to the structure carrying the ball member mounted in the socket of the slotted ball member and movable into and out of locking engagement with said surface.

10. An adjustable-angle thermometer comprising a bulb and a stem connected by a flexible metal capillary tube of substantial length, a thermometer well mounting for the bulb, a case for supporting the stem, a structure connecting the well mounting and case and having a passageway through which the flexible capillary tube extends, said structure including a ball member attached to the case and a ball member attached to the mounting, one of said ball members being slotted and having a socket therein, the other of said ball members being carried on a neck-like portion and mounted in the socket of said one ball member, said neck-like portion being receivable in said slots whereby the case may be pivoted to extreme angular positions with respect to the well mounting.

EDWARD P. DOBRIN.

No references cited.